(12) United States Patent
Shimamura

(10) Patent No.: US 8,495,565 B2
(45) Date of Patent: Jul. 23, 2013

(54) SERVICE PROVIDING APPARATUS, SERVICE PROVIDING SYSTEM, SERVICE PROVIDING METHOD, AND STORAGE MEDIUM

(75) Inventor: Hisashi Shimamura, Tokyo (JP)

(73) Assignee: NEC Corporation, Tokyo (JP)

( * ) Notice: Subject to any disclaimer, the term of this patent is extended or adjusted under 35 U.S.C. 154(b) by 34 days.

(21) Appl. No.: 13/143,146

(22) PCT Filed: Dec. 24, 2009

(86) PCT No.: PCT/JP2009/007205
§ 371 (c)(1),
(2), (4) Date: Jul. 1, 2011

(87) PCT Pub. No.: WO2010/079566
PCT Pub. Date: Jul. 15, 2010

(65) Prior Publication Data
US 2011/0270946 A1  Nov. 3, 2011

(30) Foreign Application Priority Data
Jan. 9, 2009  (JP) .................................. 2009-003308

(51) Int. Cl.
*G06F 9/44*  (2006.01)
(52) U.S. Cl.
USPC ........................................................ 717/107
(58) Field of Classification Search
USPC ........................................................ 717/710
See application file for complete search history.

(56) References Cited

U.S. PATENT DOCUMENTS

| | | | | |
|---|---|---|---|---|
| 6,560,234 | B1 * | 5/2003 | Ben-Michael et al. | 370/401 |
| 6,976,037 | B1 * | 12/2005 | D'Souza et al. | 1/1 |
| 6,986,148 | B2 * | 1/2006 | Johnson et al. | 719/332 |
| 7,418,700 | B2 * | 8/2008 | Zimniewicz et al. | 717/175 |

FOREIGN PATENT DOCUMENTS

| | | |
|---|---|---|
| JP | 11-338823 A | 12/1999 |
| JP | 2000-298561 A | 10/2000 |
| JP | 2002297394 A | 10/2002 |
| JP | 2003337702 A | 11/2003 |
| JP | 2004133690 A | 4/2004 |
| JP | 2004534304 A | 11/2004 |
| JP | 2004-348519 A | 12/2004 |
| JP | 2004-280814 A | 10/2008 |
| JP | 2008242873 A | 10/2008 |

OTHER PUBLICATIONS

International Search Report for PCT/JP2009/007205 mailed Jan. 26, 2010.
Japanese Office Action for JP2010-545639 mailed on May 28, 2013 with English Translation.

* cited by examiner

*Primary Examiner* — Lance L Barry

(57) ABSTRACT

A service providing apparatus (100) includes a request reception responding unit (101), a component injection unit (102), a configuration information storage unit (104), and a component loader group (150). The component loader group (150) of the service providing apparatus (100) includes a default component loader (110), component loaders (111), (112), . . . , and (11N), a default service class group (120), and customized class groups (121), (122), . . . , and (12N).

10 Claims, 14 Drawing Sheets

FIG. 10

```
package com.nec.jp.spr1;

public class AnalyzeData {
   ...
   private IDrawGraph graph;          /4011
   private ICalcData calc;            /4012

...

public invoke(String param1, String param2) {
      ...
      calc.prepare(param1);           /4051
      ...
      graph.draw(param2);             /4052
      ...
   }
}
```
4001

SERVICE PROVIDING APPARATUS, SERVICE PROVIDING SYSTEM, SERVICE PROVIDING METHOD, AND STORAGE MEDIUM

This application is the National Phase of PCT/JP2009/007205, filed Dec. 24, 2009, which claims priority based on Japanese Patent Application No. 2009-003308, filed on Jan. 9, 2009, the entire disclosure of which is incorporated herein by reference.

TECHNICAL FIELD

The present invention relates to a service providing apparatus, a service providing method, and a storage medium storing a service providing program.

BACKGROUND ART

Recently, SaaS (Software as a Service)/ASP (Application Service Provider) type services for providing various services on the same platform to a plurality of users have gained attention. As a representative of such type of services, for example, Salesforce.com or the like exists.

Since such SaaS/ASP type services are on the assumption that contracted users use pre-prepared services, it is not sufficient to provide only the functions of default services, but customization for each user is required (this is called a customization requirement).

For such a customization requirement for each user, an existing ASP service provider has constructed a user-dedicated customized service providing apparatus on server hardware or a virtual OS (Operating System) that is individually prepared for each user. For example, a solution for constructing a user-dedicated customized service providing apparatus using a virtual technique, for example, of VMWare (http://www.vmware.com/jp/), Xen (http://www.xen.org/), or the like, has been provided. In this case, middleware, OS, or server hardware, which is a lower layer of this service, is deployed in large amount for each user.

In addition, as a method for providing a customized service for each user, there is a method for deploying a customized service for each user on an application server by using the application server that uses Java (registered trademark) technology or the like. A simplified configuration diagram for this method is illustrated in FIG. 13.

A service providing apparatus 1 illustrated in FIG. 13 is provided with a request reception responding unit 5, a default service loader 10, and service loaders 11 to 1N for users.

In the default service loader 10, a default service class group 20 for providing services to unspecified users is deployed. On the other hand, in the service loaders 11 to 1N for users, customized service class groups 21 to 2N that reflect the customization requirements for the users are deployed. Now, how the classes are deployed in the respective service loaders 11 to 1N will be described using FIG. 14.

In FIG. 14, the default service class group 20 loaded in the default service loader 10 has a default service composite 2000. This default service composite 2000 has components 2001, 2002, 2003, and 2004.

In the customized service class group 21 that is loaded in the service loader 11, the same class as the default service composite 2000 is deployed, but in this class, a customized component 2011 is deployed instead of the component 2002. By deploying this component 2011, the customization requirement is satisfied.

In the same manner, in the customized service class group 22 that is loaded in the service loader 12, a customized component 2021 is deployed instead of the component 2004. By deploying this component 2021, the customization requirement is satisfied.

As illustrated in FIG. 14, in this method, the components 2001 and 2003 that can be shared are multiply deployed in the service loader.

As described above, with respect to the method of deploying the same service for each user, it may be considered that only one service is deployed and a logic that implements the customization requirement is incorporated into the service. In this case, however, whenever the customization requirement occurs, it is necessary to correct the service logic so that the customization requirement branches off to an added customization requirement and to perform recompile or redeployment of the service. Further, in this case, it is necessary to temporarily stop the entire service.

In order to solve the stop of the entire, service according to the change of the service as described above, an example of a system that changes a part of highly modularized software and redeploys the service without stopping the entire software is disclosed in Patent Document 1.

Further, as the same system as Patent Document 1, an example of a system that can add a plug-in module without performing the recompile or restart is disclosed in Patent Document 2.

RELATED DOCUMENTS

Patent Documents

[Patent Document 1] Japanese Laid-Open Patent Publication No. 2003-337702

[Patent Document 2] Japanese National Publication of International Patent Application, No. 2004-534304

SUMMARY OF THE INVENTION

However, as illustrated in FIGS. 13 and 14, techniques described in Patent Documents 1 and 2 have room for improvement as follows.

That is, it is difficult to achieve both corresponding to a customized requirement for each user and effective use of resources in a computer.

This is because it is difficult to include a customization requirement for each user in the service in the case where plural users use one service. It is surely possible to program the service so that behaviors are changed according to users of requestors. In this case, however, whenever a new user and its customization requirement are added, it is required to perform the change and redeployment of a service code.

Because of this, in order to cope with the customization requirement for each user, a method for multiply deploying the same service for each user and reflecting customization requirements in the respective services becomes the easiest implementation method. Further, as methods for multiply deploying the same service for each user, various implementation methods, such as preparing hardware for the users, preparing virtual OS on the same hardware, and the like, may be considered.

According to these methods, however, since service components, middleware, OS, hardware, and the like, which can be commonly used, are multiply deployed, resources of a computer are wasted.

Accordingly, there is a problem that it is difficult to achieve both corresponding to a customized requirement for each user and effective using of resources in an electronic computer.

The present invention has been made in consideration of the above-described situations, and an object of the present invention is to provide a service providing apparatus, a service providing system, a service providing method, and a storage medium storing a service providing program, which can achieve both corresponding to a customized requirement for each user and effective use of resources in a computer.

According to the present invention, a service providing apparatus includes a shared component storage unit storing a shared component which is shared among users among components composed of software components; a shared component loader unit reading the shared component from the shared component storage unit and retaining the shared component in an executable state; an individual component storage unit storing an individual component used by a user among the components composed of the software components for every user; an individual component loader unit reading the individual component from the individual component storage unit and retaining the individual component in an executable state; a configuration information storage unit storing configuration information that indicates a reference for the shared component or the individual component together with information that indicates at least one of the shared component and the individual component, which corresponds to a user identifier allocated to each user; a request reception unit receiving the user identifier from an external terminal through a network; a component acquisition unit acquiring the shared component or the individual component indicated by the configuration information that corresponds to the user identifier received by the request reception unit from the shared component loader unit or the individual component loader unit; a program code generation unit generating program code in an executable form by substituting the information that indicates the shared component or the individual component acquired by the component acquisition unit in the reference indicated by the configuration information; a program execution unit executing the generated program code and obtaining the result of the execution; and a responding unit responding the result of the execution to the external terminal to provide a communication service.

According to the present invention, a service providing system includes an external terminal and a service providing apparatus connected to the external terminal through a network, wherein the service providing apparatus includes a shared component storage unit storing a shared component which is shared among users among components composed of software components; a shared component loader unit reading the shared component from the shared component storage unit and retaining the shared component in an executable state; an individual component storage unit storing an individual component used by a user among the components composed of the software components for every user; an individual component loader unit reading the individual component from the individual component storage unit and retaining the individual component in an executable state; a configuration information storage unit storing configuration information that indicates a reference for the shared component or the individual component together with information that indicates at least one of the shared component and the individual component, which corresponds to a user identifier allocated to each user; a request reception unit receiving the user identifier from an external terminal through a network; a component acquisition unit acquiring the shared component or the individual component indicated by the configuration information that corresponds to the user identifier received by the request reception unit from the shared component loader unit or the individual component loader unit; a program code generation unit generating a program code in an executable form by substituting the information that indicates the shared component or the individual component acquired by the component acquisition unit in the reference indicated by the configuration information; a program execution unit executing the generated program code and obtaining the result of the execution; and a responding unit responding the result of the execution to the external terminal to provide a communication service.

According to the present invention, a service providing method includes reading and retaining a shared component composed of a software component in an executable state; reading and retaining an individual component composed of the software component in an executable state; receiving a user identifier allocated to a user from an external terminal through a network; acquiring the shared component that is retained in the executable state or the individual component that is retained in the executable state based on (i) configuration information that indicates a reference for the shared component or the individual component together with information that indicates at least one of the shared component and the individual component, which corresponds to the user identifier allocated to each user, and based on (ii) the received user identifier; generating a program code in an executable form by substituting the information that indicates the acquired shared component or the acquired individual component in the reference indicated by the configuration information; executing the generated program code and obtaining the result of the execution; and responding the result of the execution to the external terminal to provide a communication service.

According to the present invention, a computer readable recording medium storing a service providing program that enables a computer to execute: a shared component loading procedure of reading and retaining a shared component composed of a software component in an executable state; an individual component loading procedure of reading and retaining an individual component composed of the software component in an executable state; a request receiving procedure of receiving a user identifier allocated to a user from an external terminal through a network; a component acquiring procedure of acquiring the shared component that is retained in the executable state in the shared component loading procedure or the individual component that is retained in the executable state in the individual component loading procedure based on (i) configuration information that indicates a reference for the shared component or the individual component together with information that indicates at least one of the shared component and the individual component, which corresponds to the user identifier allocated to each user, and based on (ii) the user identifier received in the request receiving procedure; a program code generation procedure of generating program code in an executable form by substituting the information that indicates the shared component or the individual component acquired in the component acquiring procedure in the reference indicated by the configuration information; a program executing procedure of executing the generated program code and obtaining the result of the execution; and a responding procedure of responding the result of the execution to the external terminal to provide a communication service.

In this case, a combination of the above-described configuration elements and conversion of exemplary embodiments of the present invention among method, apparatus, system, recording medium, computer program, and the like, are effective as aspects of the present invention.

According to the present invention, a service providing apparatus, a service providing system, a service providing method, and a storage medium storing a service providing program, which can achieve both corresponding to a customized requirement for each user and effective using of resources in a computer, can be provided.

BRIEF DESCRIPTION OF THE DRAWINGS

The above and other objects, advantages and features will become more apparent from the following description of preferred exemplary embodiments taken in conjunction with the accompanying drawings, in which:

FIG. 10 is a diagram illustrating an example of a program code that is a composite implementation example in a service providing apparatus according to an exemplary embodiment of the invention;

DESCRIPTION OF EMBODIMENTS

Figure 1:
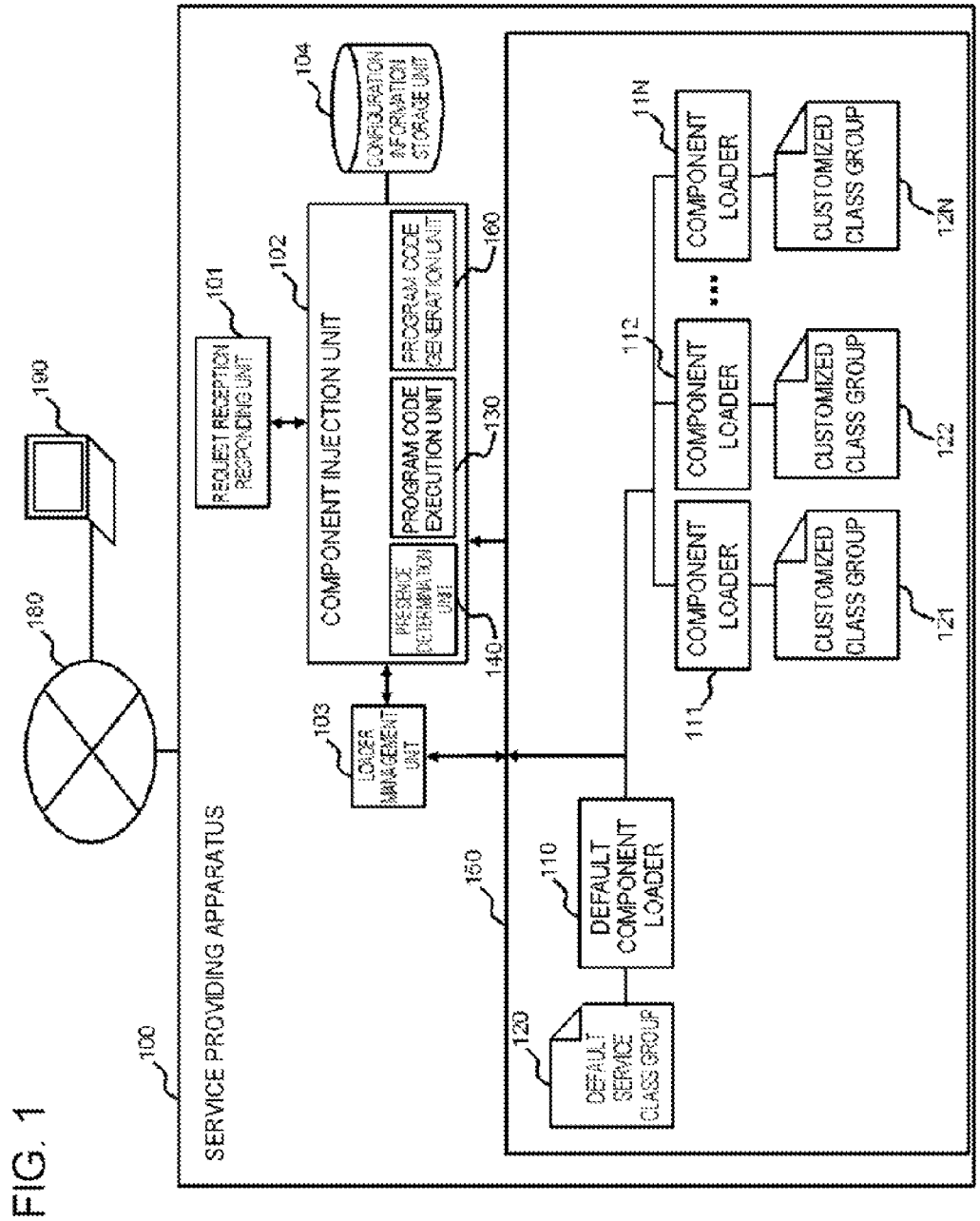
FIG. 1 is a schematic diagram illustrating the schematic configuration of a service providing system according to an exemplary embodiment of the invention.

An exemplary embodiment of the invention will be described with reference to the accompanying drawings. In all drawings, the same reference numerals are given to the same configuration elements, and the detailed description thereof will be omitted.

FIG. 1 is a schematic diagram illustrating the schematic configuration of a service providing system according to an exemplary embodiment of the invention. The service providing system illustrated in FIG. 1 includes a service providing apparatus 100, a network 180, and an external terminal 190.

The service providing apparatus 100 illustrated in FIG. 1 includes a request reception responding unit 101, a component injection unit 102, a configuration information storage unit 104, and a component loader group 150. Also, the component loader group 150 includes a default component loader 110, component loaders 111, 112, . . . , and 11N, a default service class group 120, and customized class groups 121, 122, . . . , and 12N.

The default service class group (shared component storage unit) 120 stores components that are shared between users among components composed of software components.

The default component loader (shared component loader unit) 110 reads a default component (shared component) from the default service class group 120 and retains the default component in an executable state.

The customized class groups (individual component storage unit) 121 to 12N store customized components (individual components) used for respective users among the components composed of software components. Here, a one or a plurality of users uses the individual components. A user of one individual component may overlap a user of another individual component. The number of users for the individual components is not specially limited, and may be a part or the entire of the users sharing the default component.

The component loaders (individual component loader unit) 111 to 11N read the customized components from the customized class groups 121 to 12N and retain the customized components in an executable state.

Further, the configuration information storage unit 104 stores configuration information indicating information that indicates at least one of the default component and the customized component, which corresponds to a user identifier allocated to each user. The configuration information also describes a reference point (reference) of the default component or the customized component.

Here, the information indicating at least one of the default component or the customized component indicates a component name, a storage area storing the component, or the like. Further, the reference point indicates an injection point that injects the default component or the customized component into an executable program. In this exemplary embodiment of the invention, the injection means substituting a component in the reference point described in the configuration information. That is, the meanings of the injection and the substitution are similar, and indicate a process that conceptually put the corresponding component in the reference point.

The request reception responding unit (request reception unit) 101 receives a user identifier from an external terminal 190 through a network 180.

The component injection unit (component acquisition unit) 102 acquires the default component or the customized component which is indicated by the configuration information corresponding to the user identifier that is received by the request reception responding unit 101 from the default component loader 110 or the component loaders 111 to 11N.

Further, the component injection unit 102 includes a program code execution unit 130 and a program code generation unit 160, and is provided with a function of executing a program code through the program code execution unit 130 and a function of generating the program code through the program code generation unit 160.

The program code generation unit 160 generates the program code in an executable form by substituting the information that indicates the acquired default component or customized component in the reference that is indicated by the configuration information.

The program code execution unit 130 executes the generated program code, and obtains the result of the execution.

As described above, the component injection unit 102 has a function of acquiring the default component or the customized component, a function of generating the program, and a function of executing the program.

The request reception responding unit (responding unit) 101 provides a communication service by returning the result of the execution by the component injection unit 102 to the external terminal 190.

At this time, the default component loader 110 loads the default service class group 120 that is required to execute the default service that does not depend on the users (in other words, the service that is shared by the users).

Further, the component loaders 111 to 11N have one-to-one relationships with the users that desire the customization requirement, and load the customized class groups 121 to 12N that implement the customization requirement corresponding to the difference from the default service class group.

In this exemplary embodiment of the invention, it is assumed that the implementation indicates a program such as an implemented concrete component or the like, and indicates a program code in an executable state or an executable form. Further, the acquisition of the default component or the customized component from the default component loader 110 or the component loaders 111 to 11N corresponds to, for example, the acquisition of an address that is a loading point. Further, in this exemplary embodiment of the invention, the acquisition is not limited to the acquisition of the address that is the loading point, but may be in the form of acquiring the corresponding component by copying as an execution program.

Further, the component loaders 111 to 11N are prepared as many as the number of users to which the customization requirements are applied, are not limited to the illustrated number, but may be optionally installed.

Further, the configuration information storage unit 104 stores the configuration information, which indicates the configuration of a service that corresponds to each user with respect to one or more services used by a plurality of users, for every user.

Accordingly, in this exemplary embodiment of the invention, the component injection unit 102 configures and executes an appropriate service composite (this is also called a composite object) according to the user of a requestor. In this case, the service composite indicates a service that can be provided to a user that is composed of a component, and the composite object means data and a program for providing the service.

As described above, the service providing apparatus 100 illustrated in FIG. 1 can implement this exemplary embodiment of the invention through providing of the above-described configuration elements.

The service providing apparatus 100 may further includes a loader management unit 103. In this case, the loader management unit 103 makes the component loaders 111 to 11N read the customized components and retains the component loader 111 to 11N in an executable state for each user.

In this case, the loader management unit 103 manages the entire loaders that store the composites and component classes.

Further, the component injection unit 102 may be provided with a presence determination unit 140.

The presence determination unit 140 determines whether the configuration information that corresponds to the user identifier received by the request reception responding unit 101 is stored in the configuration information storage unit 104.

If the presence determination unit 140 determines that the configuration information corresponding to the user identifier is not stored in the configuration information storage unit 104, the component injection unit 102 acquires the default component from the default component loader 110. Further, the component injection unit 102 generates the program code for implementing the default service by substituting the information that indicates the acquired default component in the reference point.

As described above, even in the case where the request reception responding unit 101 receives the user identifier that is not registered in the configuration information storage unit 104, the component injection unit 102, which is further provided with the presence determination unit 140, can provide the default service to the user.

Figure 2:
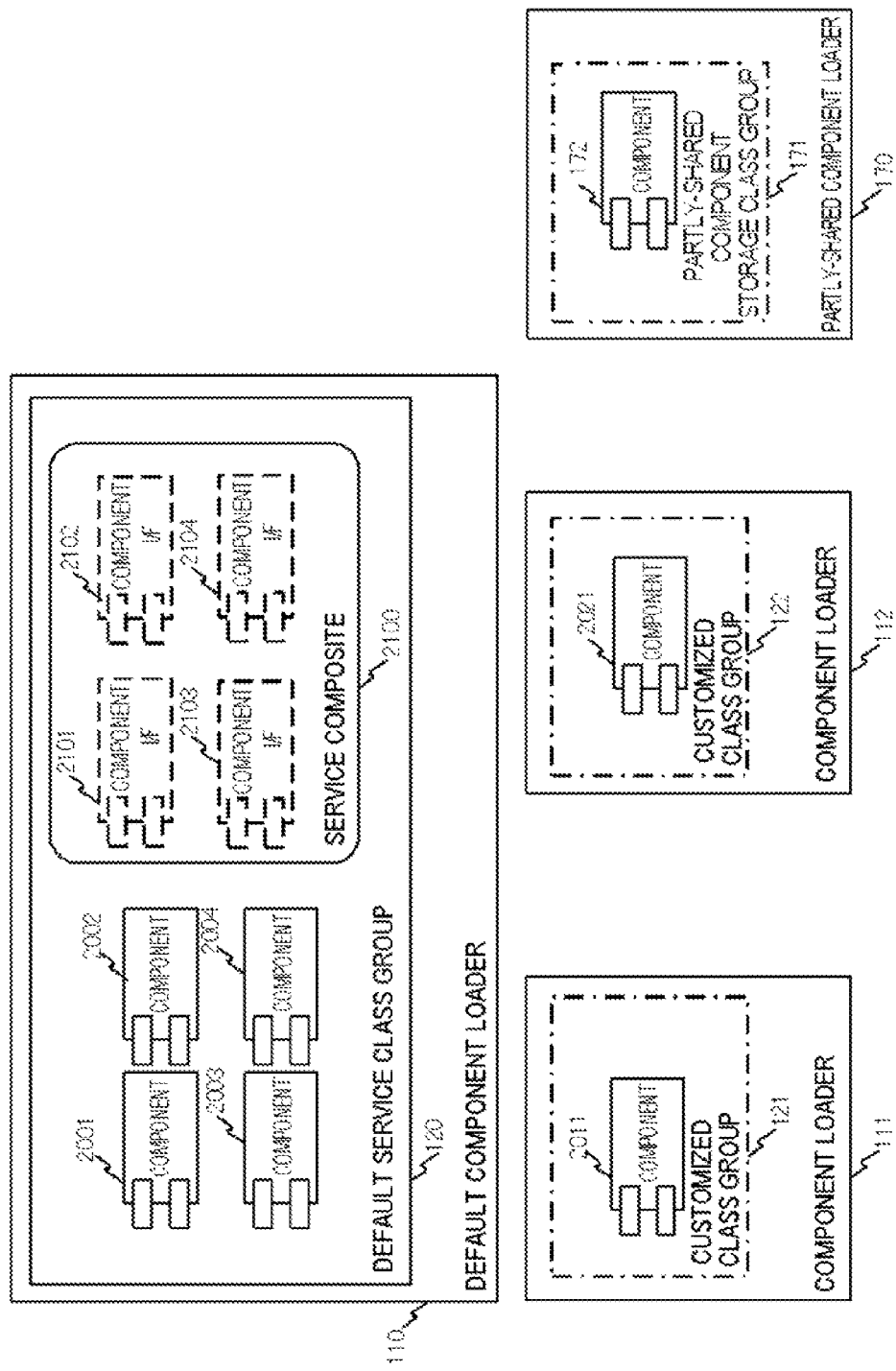
FIG. 2 is a diagram illustrating an example of a deployment model of a service providing apparatus according to an exemplary embodiment of the invention.

FIG. 2 is a diagram illustrating an example of a model that deploys a component (deployment model) in the service providing apparatus 100 according to this exemplary embodiment.

The default component loader 110 illustrated in FIG. 2 is loaded with a default service class group 120 (FIG. 1) for implementing the default service that does not depend on the user. The default service class group 120 has a service composite 2100 in which a composite service logic is described. This service composite 2100 has component interfaces (I/F) 2101 to 2104 that indicate the reference points of abstracted components.

Further, the default service class group 120 has default implemented components 2001 to 2004 that correspond to the component I/F 2101 to 2104.

The component loader 111, for example, is loaded with a customized class group 121 in which the customization requirement for service A is implemented. The customized class group 121 has a component 2011 customized for service A that is not a default operation. This customized component 2011 corresponds to the component I/F 2102 that is the reference point of the service composite 2100.

In the same manner, the component loader 112 is loaded with a customized class group 122. The customized class group 122 has a component 2021 customized for service B. This customized component 2021 corresponds to the component I/F 2104 that is the reference point.

Figure 14:
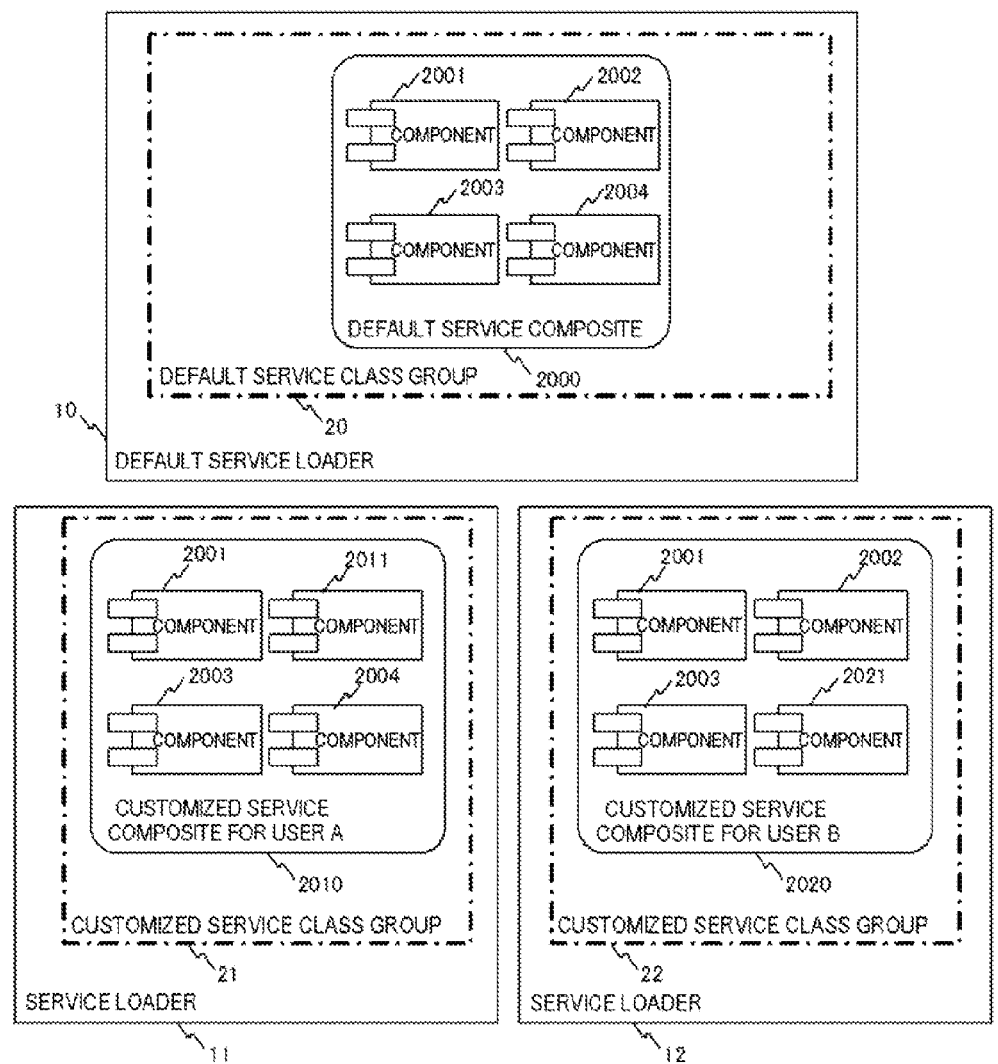
FIG. 14 is a diagram illustrating an example of a deployment model of a service providing apparatus.

In this exemplary embodiment, by the above-described configuration, the component that is not the subject of customization is shared with another service, and thus the waste of resources, such as multiple loading of the same component illustrated in FIG. 14, does not occur.

However, the above-described deployment model is exemplary, and in this exemplary embodiment of the invention, the number of component loaders may be increased or decreased, and the component loaders have diverse numbers or various configurations together with composites and components loaded in the component loaders.

That is, in this exemplary embodiment of the invention, the component and composite which are related to a default service is loaded in the default component loader, and the component which becomes the difference that requires the customization is loaded in the component loader for each user.

However, the number of components or service composites that constitute the service (plural services may exist) and which loader the components or service composites are loaded in may differ according to cases or conditions, but are not limited to those as described above.

For example, partly-shared component loader 170 may be further provided, which holds the same customized component 172 that is commonly used by users accounting for a rate equal to or higher than a predetermined rate in an executable state (see FIG. 2). In this case, the same customized component means a component that can show the equal or the same kind of function. Accordingly, the same customized component can provide the equal or the same kind of service within the range where providing of the service is not hindered.

In this exemplary embodiment of the invention, partly-shared component storage class groups 171 that store the same individual components are further provided, and the loader management unit 103 can move the same customized component 172 from the customized component storage class group to the partly-shared component storage class group 171 and generate partly-shared component loaders 170.

In this exemplary embodiment of the invention, the component indicates a software component for implementing a function. For example, the component is a software component constructed based on an object oriented programming technology, a component oriented programming technology, an SOA (Service Oriented Architecture) technology, and the like. Further, in this exemplary embodiment of the invention, it is assumed that a function unit having a larger grain size, which is implemented by a combination of the components, is called a composite. Further, the composite itself may be seized as a component that constitutes the composite having a larger grain size.

Further, in this exemplary embodiment of the invention, the class means a file that is converted into an executable form through compiling of the program behavior. Accordingly, in the case of expressing the class as the component class, the class means an executable component through compiling of the component. Further, it is assumed that an executed program is composed of data to be executed and a process to be executed. Further, an object is composed of a combination of a program and set data. Further, a completely executable state or a running state of an executable program being read is called an instance. That is, what has been instantiated is a program in an executable form.

In this exemplary embodiment of the invention, a user refers to a general subject that uses the service provided from the service providing apparatus 100. Specifically, a user indicates a human, a terminal device that a human uses, a program, and further an apparatus and a program that operates with no direct relationship with human interaction.

Next, a schematic operation of each part that constitutes the service providing apparatus 100 will be described.

The request reception responding unit 101 receives request data from a user that operates the external terminal 190 through the network 180. The request reception responding unit 101 extracts information (user identifier) for determining a requestor from request data, information for identifying the used service, and a parameter for the used service. Further, the request reception responding unit 101 transfers the extracted information to the component injection unit 102.

The component injection unit 102 inquires of the configuration information storage unit 104 based on the information or the like acquired from the request reception responding unit 101. Further, the component injection unit 102 acquires a set of a service composite of a caller and a component to be injected from the configuration information storage unit 104. The component injection unit 102 acquires information on which component class the necessary service composite and the component class to be injected exist in from the loader management unit 103. Further, the component injection unit 102 makes the service composite substantial by injecting the component class into an abstractive reference point of the component to be injected and the service composite acquired from the configuration information storage unit 104.

Further, the component injection unit 102 executes the substantialized service composite. Also, the request reception responding unit 101 returns the return value for which the substantialized service composite is executed to the user having the external terminal 190 through the network 180.

At this time, the injection, in this exemplary embodiment of the invention, represents the process of substantiating the component implementation in the reference point.

Figure 3:
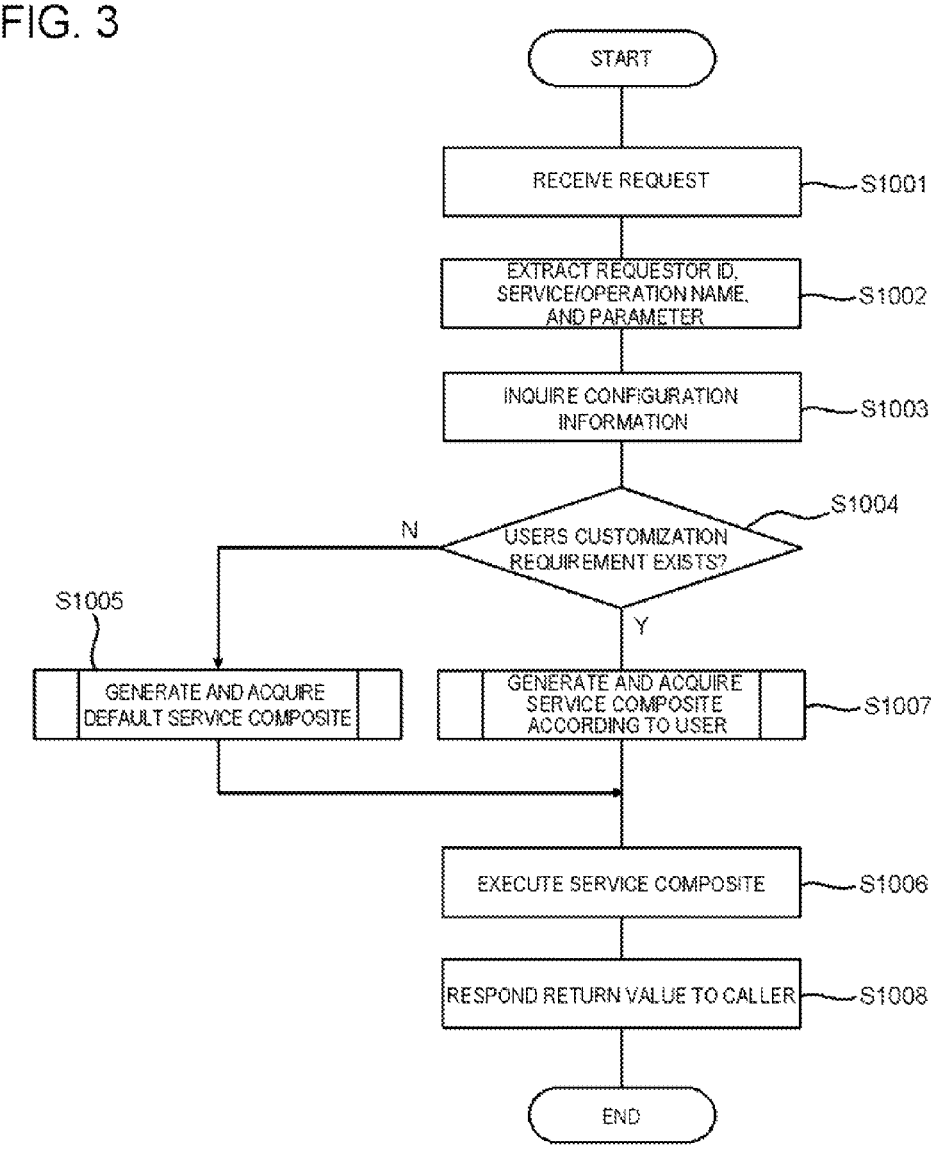
FIG. 3 is a flowchart illustrating the entire operation of a service providing apparatus according to an exemplary embodiment of the invention.

Next, the entire operation of the service providing apparatus 100 according to this exemplary embodiment will be described by using the drawings. FIG. 3 is a flowchart illustrating the entire operation of the service providing apparatus 100 according to this exemplary embodiment.

In the flowchart illustrated in FIG. 3, the request reception responding unit 101 first receives request data from a user (step S1001). The request reception responding unit 101 extracts user information (user information such as a user identifier), information required to specify the used service, a parameter, and the like from the request data (step S1002).

The component injection unit 102 receives a set of the extracted user information, information required to specify the service, parameter, and the like, from the request reception responding unit 101. Further, the component injection unit 102 inquires of the configuration information storage unit 104 for the configuration information of the service that corresponds to the user information (step S1003).

Here, the component injection unit 102 determines whether or not the customization requirement for the user information exists (step S1004). If the customization requirement exists in the configuration information storage unit 104 ("Y" in step S1004), the component injection unit 102 acquires the configuration information according to the user from the configuration information storage unit 104. Further, the component injection unit 102 generates the service composite based on the configuration information, and acquires its composite object (step S1007).

On the other hand, if the customization requirement does not exist in the configuration information storage unit 104 as the result of determination in step S1004 ("N" in step S1004), the component injection unit 102 acquires the configuration information of the default service from the configuration information storage unit 104. Further, the component injection unit 102 generates the service composite from the configuration information of the default service, and acquires its composite object (step S1005).

The component injection unit 102 performs the service process by executing the composite object acquired in step S1005 or S1007 (step S1006). The request reception responding unit 101 returns the result of the service process to the user through the network 180 as the response to the request data (step S1008).

Figure 4:
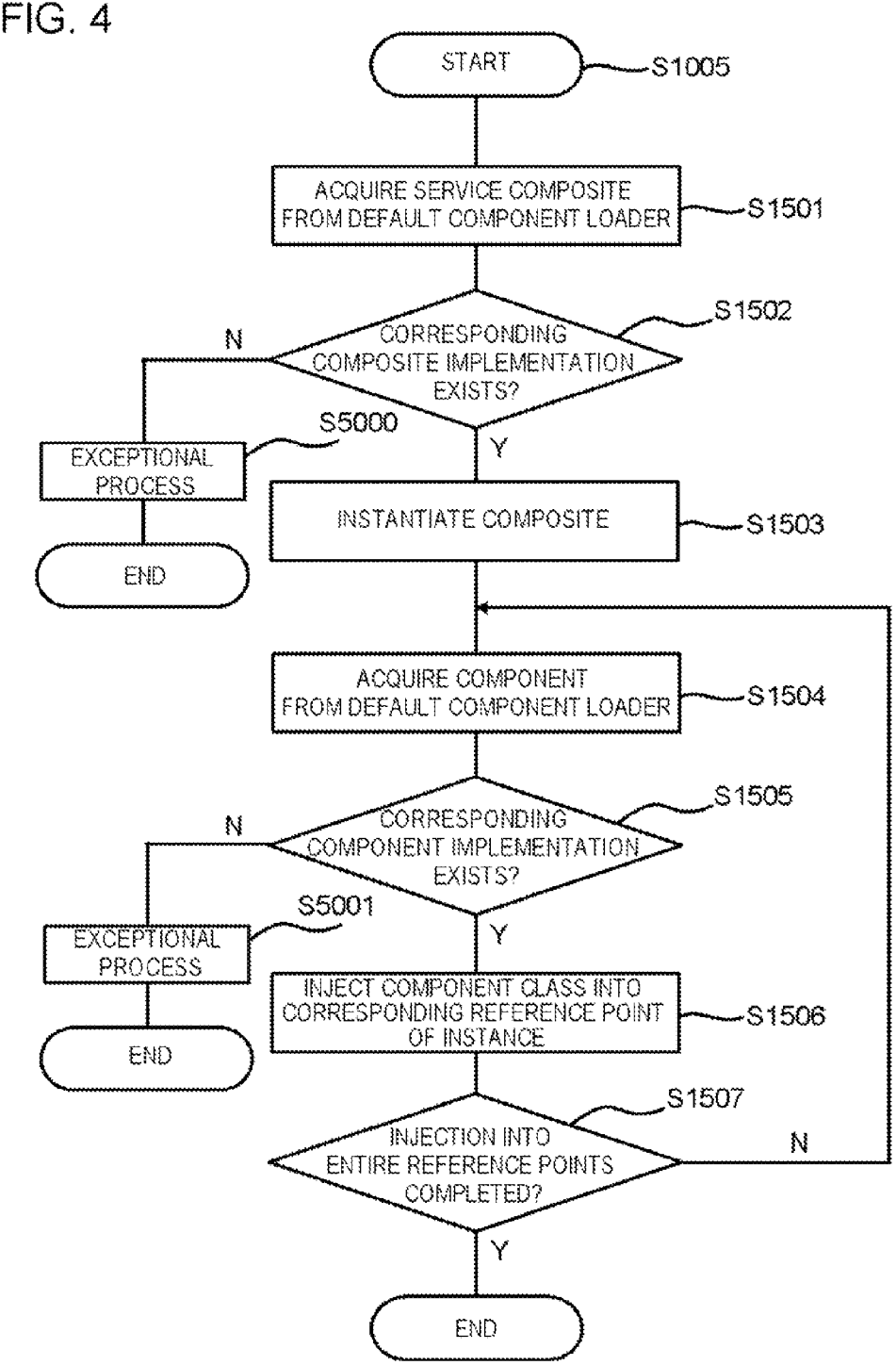
FIG. 4 is a flowchart illustrating a process of generating a default service composite of a service providing apparatus according to an exemplary embodiment of the invention.
Figure 5:
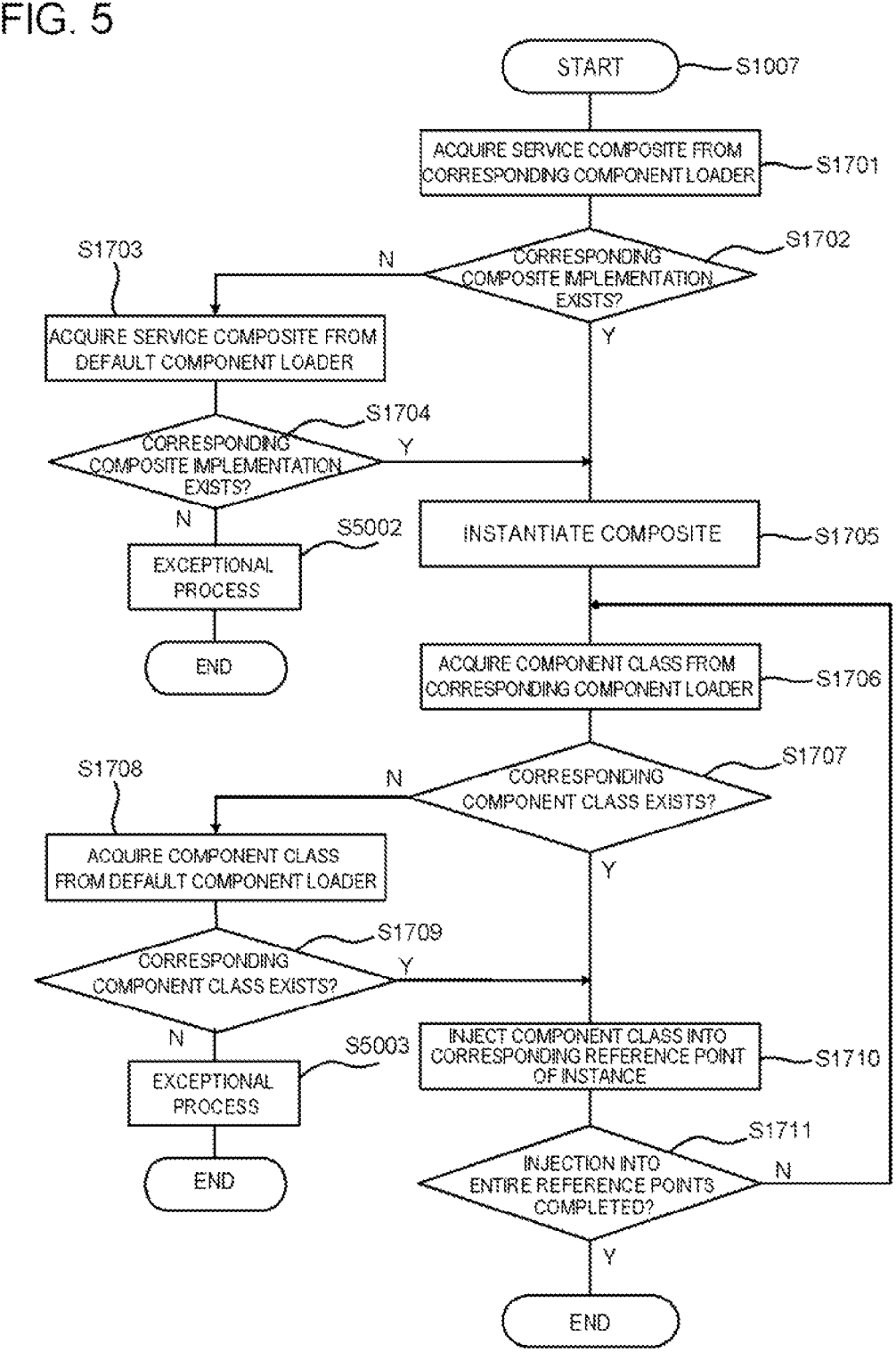
FIG. 5 is a flowchart illustrating a process of generating a service composite according to a user of a service providing apparatus according to an exemplary embodiment of the invention.

Next, in the above-described procedure, a procedure in which the component injection unit 102 generates the service composite in steps S1005 and S1007 will be described in detail with reference to the flowcharts of FIGS. 4 and 5. FIG. 4 is a flowchart illustrating a process of generating a default service composite in step S1005.

First, in the process of generating the default service composite, the service composite 2100 (FIG. 2), which is designated by the configuration information received from the configuration information storage unit 104, is acquired from the default component loader 110 (step S1501).

The component injection unit 102 determines whether the corresponding service composite 2100 (this is also called a corresponding composite) can be acquired from the default component loader 110 (step S1502).

If the corresponding composite cannot be acquired ("N" in step S1502), the component injection unit 102 performs exception process by outputting an error that indicates that the corresponding service cannot be executed, and finishes the process (step S5000). The exception process, for example, means that a currently processed transaction is interrupted through execution of a rollback, and the current state returns to the state before the transaction process starts.

On the other hand, if the corresponding composite can be acquired ("Y" in step S1502), the component injection unit 102 instantiates the acquired service composite to be executable (step S1503).

Here, the instantiating to be executable, in the same manner as described above, means reading the program in the executable form and setting it to a completely executable state.

The component injection unit 102 acquires the component class which is designated by the configuration information and should be injected from the default component loader 110 (step S1504). Further, the component injection unit 102 determines whether or not the corresponding component class (this is called the corresponding component) could have been acquired (step S1505).

If the corresponding component could not be acquired ("N" in step S1505), in the same manner as in step S5000, the component injection unit 102 outputs an error, performs the exception process, and finishes the process (step S5001).

On the other hand, if the corresponding component could be acquired ("Y" in step S1505), the component injection unit 102 injects the acquired component class into the reference point of the service composite instantiated in step S1503 (step S1506).

After the injection of the component class, the component injection unit 102 determines whether or not the component class has been injected into all reference points (step S1507). If there is any component class which has not yet been injected ("N" in step S1507), the component injection unit 102 returns to step S1504 and performs injection of the next component class.

On the other hand, if the injection of the component class into all the reference points is completed ("Y" in step S1507), the component injection unit 102 finishes the process of generating the service composite, and returns to step S1006 of the service providing procedure.

Next, the procedure of generating a service composite in step S1007 will be described in detail with reference to a flowchart of FIG. 5. FIG. 5 is a flowchart illustrating a procedure of generating a service composite according to a user in step S1007.

First, in the procedure of generating the service composite according to the user, the component injection unit 102 acquires the service composite that is designated by the configuration information received from the configuration information storage unit 104 from the component loader of the corresponding user (step S1701).

The component injection unit 102 determines whether the corresponding service composite could have been acquired from the component loader of the corresponding user (step S1702).

If the corresponding composite could not have been acquired ("N" in step S1702), the component, injection unit 102 acquires the same service composite from the default component loader 110 (step S1703).

The component injection unit 102 determines whether the service composite could have been acquired from the default component loader 110 (step S1704). If the corresponding composite could not have been acquired ("N" in step S1704), the component injection unit 102, in the same manner as in step S5000, outputs an error that indicates the corresponding service could not be executed, performs the exception process by outputting, and finishes the process (step S5002).

If it is determined that the service composite could have been acquired in any one of steps S1702 and S1704 ("Y" in step S1702 or "Y" in step S1704), the component injection unit 102 instantiates its service composite to be executable (step S1705).

The component injection unit 102 acquires the component class which is designated by the configuration information and should be injected from the component loader of the corresponding user (step S1706). Also, the component injection unit 102 determines whether this component class could have been acquired from the component loader of the corresponding user (step S1707).

If the corresponding component class could not have been acquired ("N" in step S1707), the component injection unit 102 acquires the same component class from the default component loader 110 (step S1708). Further, the component injection unit 102 determines whether this component class could have been acquired from the default component loader 110 (step S1709).

Also, if the corresponding component class could not have been acquired ("N" in step S1709), the component injection unit 102, in the same manner as in step S5000, outputs an error that indicates the corresponding service could not be executed, performs the exception process, and finishes the process (step S5003).

On the other hand, in step S1707 or S1709, if the component class could have been acquired ("Y" in step S1707 or "Y" in step S1709), the component injection unit 102 injects the acquired component class into the reference point of the service composite instantiated in step S1705 (step S1710).

After the injection of the component, the component injection unit 102 determines whether the component classes have been injected into all reference points (step S1711), and if there is any component class which has not yet been injected ("N" in step S1711), the component injection unit 102 returns to step S1706 to perform injection of the next component class.

On the other hand, if the injection of the component class into all the reference points is completed ("Y" in step S1711), the component injection unit 102 finishes the process of generating the service composite, and returns to step S1006 of the service providing procedure.

As described above, according to this exemplary embodiment, if the service request is received, the service providing apparatus 100 generates the service composite according to the user and executes the service process, and thus it becomes possible to cope with the customization requirement according to the user. Also, since it is possible to manage only the component necessary to customize for each user and to share the components necessary to provide other services, both of the customization and the effective use of resources in a computer can be achieved together.

Further, in this exemplary embodiment, component loaders which differ according to the users are generated and configured, but the exemplary embodiment is not limited thereto. For example, a configuration that performs grouping for respective shared component loaders through grouping of customized functions of plural users may be adopted.

Specifically, this configuration is efficient in the case where there are many users in the unit of contract and organization and customization components which are commonly used by users accounting for a rate equal to or higher than a predetermined rate can be grouped. In this case, since the component loaders of the customized components to be grouped (partly-shared component loader) can be shared, the management of the component loaders is facilitated.

Next, using more detailed examples, the operation according to this exemplary embodiment will be described with reference to the drawings. The details to be described hereinafter are exemplary, and the operation or data form according to this exemplary embodiment is not limited thereto.

In the following examples, it is assumed that a Java language and its processing system (http:/www.java.sun.com) are applied to the composite implementation, component implementation, and processing platforms.

Figure 6:
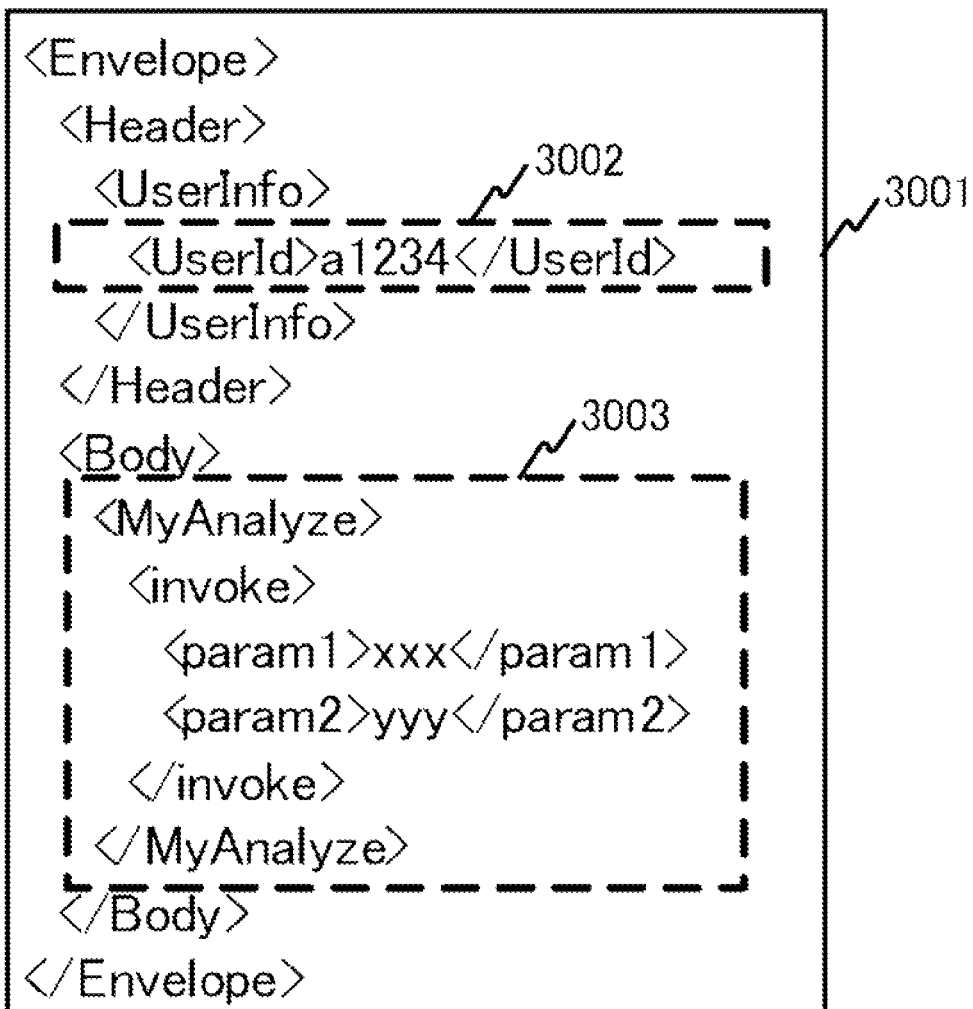
FIG. 6 is a diagram illustrating an example of request data in a service providing apparatus according to an exemplary embodiment of the invention.

First, an example of request data from a user is illustrated in FIG. 6. In FIG. 6, the request data 3001 is described in an XML (Extensible Markup Language, http:/www.w3.org/TR/xml) form. Further, the request data 3001 is transmitted from the user that operates the external terminal 190 through the network 180 by using a protocol such as HTTP (HyperText Transfer Protocol, RFC2616).

The service providing apparatus 100 acquires the request data 3001, executes a composite service based on the request data 3001, and returns the result of service process to the user as a response to the request data 3001.

First, the request reception responding unit 101 receives the request data 3001 through the network 180. The request reception responding unit 101 extracts user information 3002 of a transmission source, service information of which the processing is requested, and a parameter 3003 from the request data 3001. Further, the request reception responding unit 101 transfers the extracted user information 3002, service information, and user information 3002 to the component injection unit 102.

According to the request data 3001 illustrated in FIG. 6, it is indicated that the user information 3002 is "a1234" and the service information is "MyAnalyze.invoke". The parameter 3003 indicates that "param1" is set to a value "xxx", and "param2" is set to a value "yyy".

The component injection unit 102 inquires of the configuration information storage unit 104 on the basis of the information and acquires the corresponding service configuration information.

Figure 7:
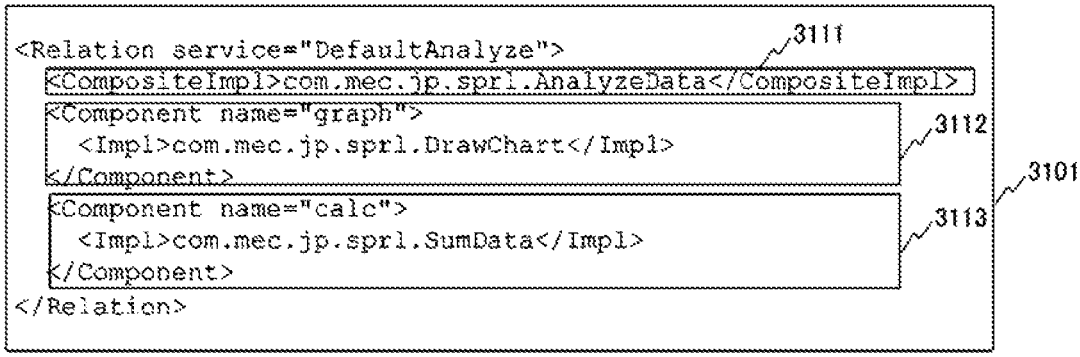
FIG. 7 is a diagram illustrating an example of service configuration information of a default service in a service providing apparatus according to an exemplary embodiment of the invention.

FIG. 7 is a diagram illustrating an example of service configuration information. The service configuration information 3101 illustrated in FIG. 7 indicates configuration information that corresponds to a default service. That is, if the configuration information that corresponds to "a1234" of the user information 3002 is not registered in the configuration information storage unit 104, the configuration information storage unit 104 returns the configuration information of the default service that corresponds to the service configuration information.

In the service configuration information 3101 of the default service, a composite implementation 3111 of the default service that corresponds to the service information "MyAnalyze.invoke" is designated.

Specifically, the composite implementation 3111 designates "com.mec.jp.sprl.AnalyzeData". Further, the service configuration information 3101 designates component implementations 3112 and 3113 to be injected to the composite implementation 3111.

Figure 8:
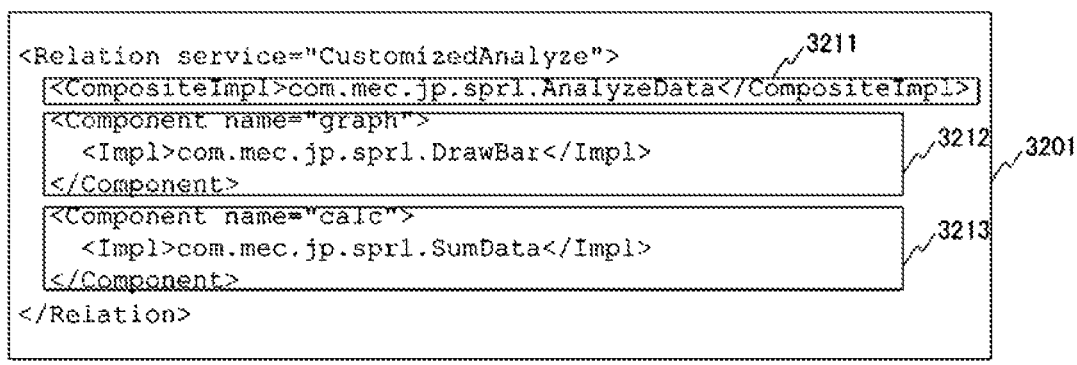
FIG. 8 is a diagram illustrating an example of service configuration information of a customized service in a service providing apparatus according to an exemplary embodiment of the invention.

By contrast, in the case where the configuration information that corresponds to "a1234" of the user information 3002 is registered in the configuration information storage unit 104, the configuration information storage unit 104 returns the configuration information of the corresponding customized service (customized service configuration information 3201: FIG. 8). In this exemplary embodiment, the service configuration information illustrated in FIG. 8 is called customized service configuration information.

In the customized service configuration information 3201 in FIG. 8, the user information 3002 of "a1234", the service information of "MyAnalyze.invoke", and composite implementation 3211 of the customized service that is determined from the parameter 3003 are designated. Also, "com.mec.jp.sprl.AnalyzeData" is designated by the composite implementation 3211. Further, component implementations 3212 and 3213 to be injected are designated by the composite implementation 3211.

Using the customized service configuration information 3201 illustrated in FIG. 8, the subsequent operation will be described.

The component injection unit 102 generates a service composite for the service process that the user has requested based on the customized service configuration information illustrated in FIG. 8. The relationship between the configuration of the component loader at that time, the composite being read, and the component is shown in FIG. 9.

Figure 9:
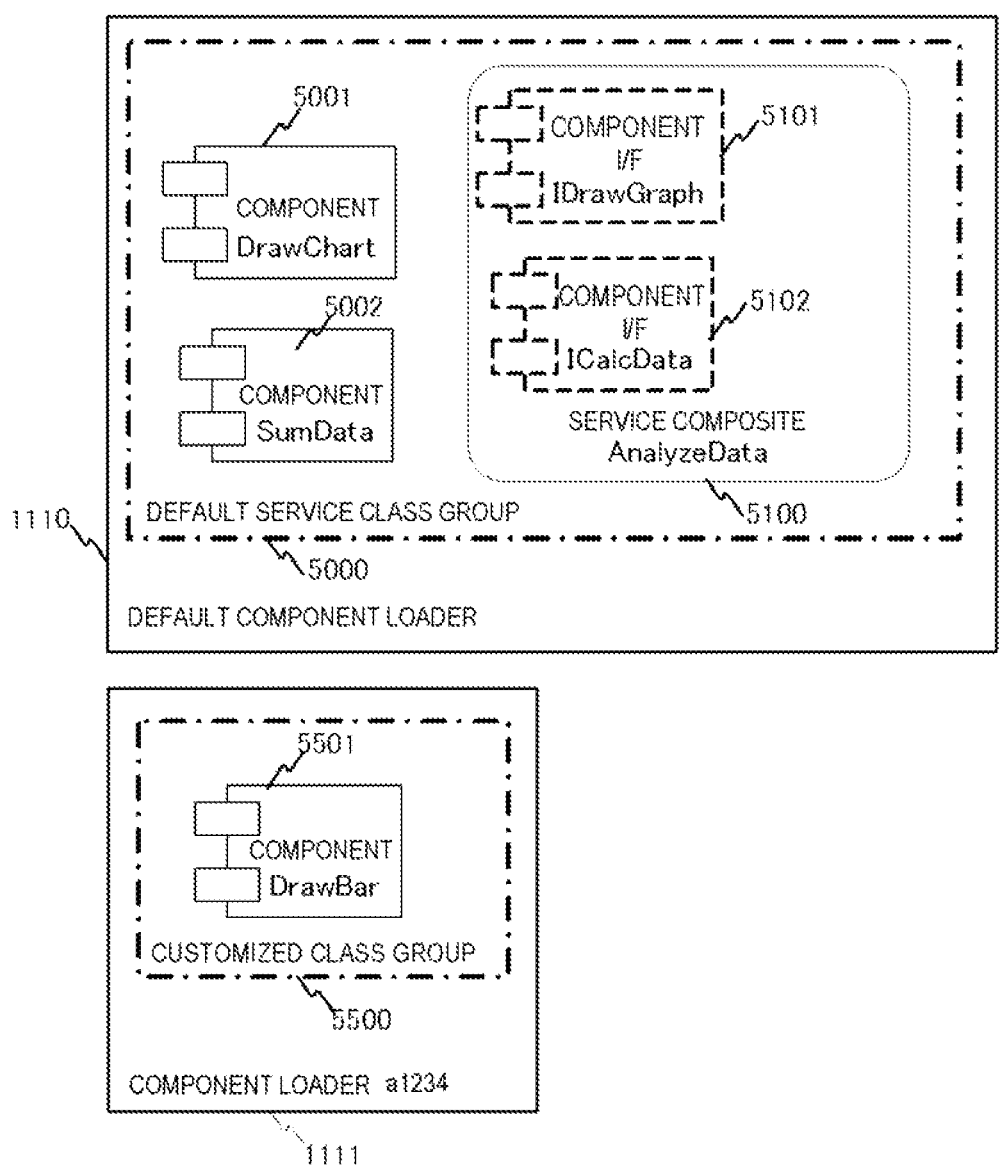
FIG. 9 is a diagram illustrating an example of the configuration of a service composite in a service providing apparatus according to an exemplary embodiment of the invention.

A default component loader 1110 illustrated in FIG. 9 reads a default service composite S100, a component 5001, and a component 5002. Also, a component loader 1111 for a user "a1234" reads a component 5501.

In this state, the component injection unit 102 tries to extract the composite implementation 3211 (FIG. 8)(that is, service composite) from the component loader 1111. However, the composite implementation 3211 does not exist in the component loader 1111. Due to this, the component injection unit 102 successfully extracts the composite implementation 3211 from the default component loader 1110.

Further, the component injection unit 102 generates an instance of the composite implementation 3211. Specifically, the component injection unit 102 tries to extract the reference point and component to be injected from the component loader 1111. The component injection unit 102 first tries to extract the component implementation "com.mec.jp.sprl.DrawBar" for the first reference point "graph" from the component loader 1111 and succeeds in it. Further, the component injection unit 102 injects (substitutes) the component implementation in the reference point "graph" of the instance of the composite implementation.

Next, the component injection unit 102 tries to acquire the component implementation "com.mec.jp.sprl.SumData" for the second reference point "calc" from the component loader 1111. However, the component implementation does not exist therein. Due to this, the component injection unit 102 tries to acquire the component implementation "com.mec.jp.sprl.SumData" from the default component loader 1110 and succeeds in it. The component injection unit 102 generates the instance of "com.mec.jp.sprl.SumData" in the same manner, and injects it into "calc".

FIG. 10 is a diagram illustrating an example of a program code that is an implementation example of a composite implementation 4001. The composite implementation 4001 implemented into Java (registered trademark) has "graph" and "calc" as a reference for another component. "graph" and "calc" are reference points for objects that implement interfaces IDrawGraph and ICalcData, respectively.

In the composite implementation 4001, the component class, which is explicitly implemented in the reference points, is not substituted. That is, the component injection unit 102 does not directly substitute the acquired component. The component injection unit 102 generates the instance of "com.mec.jp.sprl.DrawBar" based on the customized service configuration information 3201 and substitutes it in "graph". The component injection unit 102 similarly generates the instance of "com.mec.jp.sprl.SumData" and substitutes it in "calc".

Accordingly, the component injection unit 102 completes the injection of the component classes into all the reference points. Then, the component injection unit 102 calls an "invoke" method of the generated composite implementation based on the user information, service information, and parameter extracted from the request data. The component injection unit 102 performs the service process through substitution of the parameter, and returns the result of the execution to the requestor through the network 180.

As described above, according to this exemplary embodiment, when receiving a request for a service of the request data, the service providing apparatus 100 generates the service composite according to the user, executes the service process, and thus can cope with detailed customization requirements.

In this exemplary embodiment, it is sufficient if the respective configuration elements are formed to implement the function. For example, they may be implemented by dedicated hardware that performs a predetermined function, a data processing apparatus having a predetermined function that is given by a computer program, a predetermined function implemented in a data processing apparatus by a computer program, and a combination thereof.

The entire or a part of the configuration included in the service providing apparatus 100 may be implemented by hardware or by a program (or a program code) that makes a computer execute the process. The computer reads and executes the program from a recording medium such as a nonvolatile memory. In this exemplary embodiment, a processor and a storage medium may be the component injection unit 102.

Further, in this exemplary embodiment, it is not necessary that the respective configuration elements are independent existences. For example, the configuration elements may be formed as one member, one configuration element may be formed by a plurality of members, a configuration element may be a part of another configuration element, a part of a configuration element may overlaps with a part of another configuration element.

Further, in this exemplary embodiment, plural processes are sequentially described by step numbers. However, the described number does not limit the order of executing a plurality of processes.

As described above, although the exemplary embodiments of the invention have been described with reference to the drawings, they are exemplifications of the invention, and may adopt various configurations other than those as described above.

MODIFIED EXAMPLES

For example, the above-described exemplary embodiments relate to the generation of a program code that provides a service by the customized component for each user. In this exemplary embodiment, allocation of the customized component may be additionally requested with respect to the existing user, or the allocation of the customized component of the existing user may be deleted. In this exemplary embodiment, an additional request for the allocation of the customized component is called deployment, and the deletion of the allocation of the customized component is called deployment release.

Specifically, the request reception responding unit 101 receives a user identifier and performs the following process when receiving information that indicates the request for the allocation of the customized component that does not correspond to the user identifier. First, the loader management unit 103 makes the component loaders 111 to 11N of the user that corresponds to the user identifier read other customized components. Further, the configuration information storage unit 104 adds information that indicates other customized components to the configuration information that corresponds to the user identifier.

Accordingly, the component injection unit 102 may receive a request for the use of other customized components that have not yet registered from the existing user and add other customized component information to the configuration information.

Figure 11:
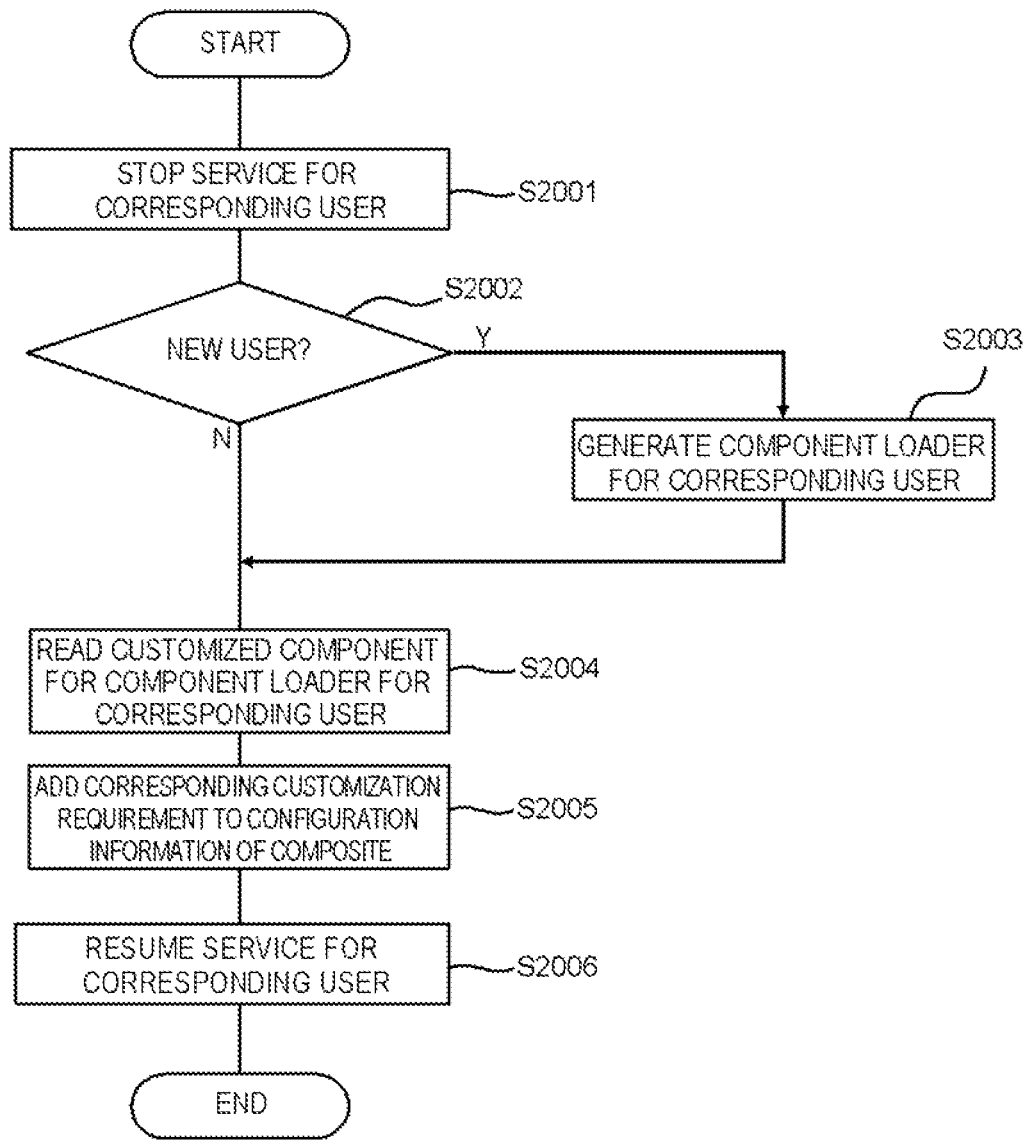
FIG. 11 is a flowchart illustrating deployment of customized components in a service providing apparatus according to an exemplary embodiment of the invention.

A procedure of performing deployment and deployment release of the customized component in the service providing apparatus 100 will be described. FIG. 11 is a flowchart illustrating a process of deploying the customized component.

In the flowchart illustrated in FIG. 11, the request reception responding unit 101 stops a service for a corresponding user to which the customization requirement is applied (this is called a service for the corresponding user)(step S2001). At this time, however, services for other users or a default service for unspecified users do not stop.

The presence determination unit 140 determines whether or not the user is a user to which a new customized requirement is applied and which does not have the component loader for the existing corresponding user (step S2002). If the presence determination unit 140 determines that the user is a new user that does not have the component loader for the corresponding user ("Y" in step S2002), the loader management unit 103 generates the component loader for the corresponding user (step S2003).

On the other hand, if the presence determination unit 140 determines that the user is not a new user ("N" in step S2002), the loader management unit 103 reads the component class that implements the customization requirement to be newly applied for the component loader for the corresponding user (step S2004).

At this time, when there is a request to which the customization requirement is applied and it is determined that the user is a new user, the loader management unit 103 may read the customization requirement for the component loader for the corresponding new user.

Then, the component injection unit 102 adds the configuration information that describes the customization requirement of the corresponding user for the composite to the configuration information storage unit 104 (step S2005). Thereafter, the component injection unit 102 resumes the service for the corresponding user (step S2006), and finishes the deployment process of the customized component.

Figure 12:
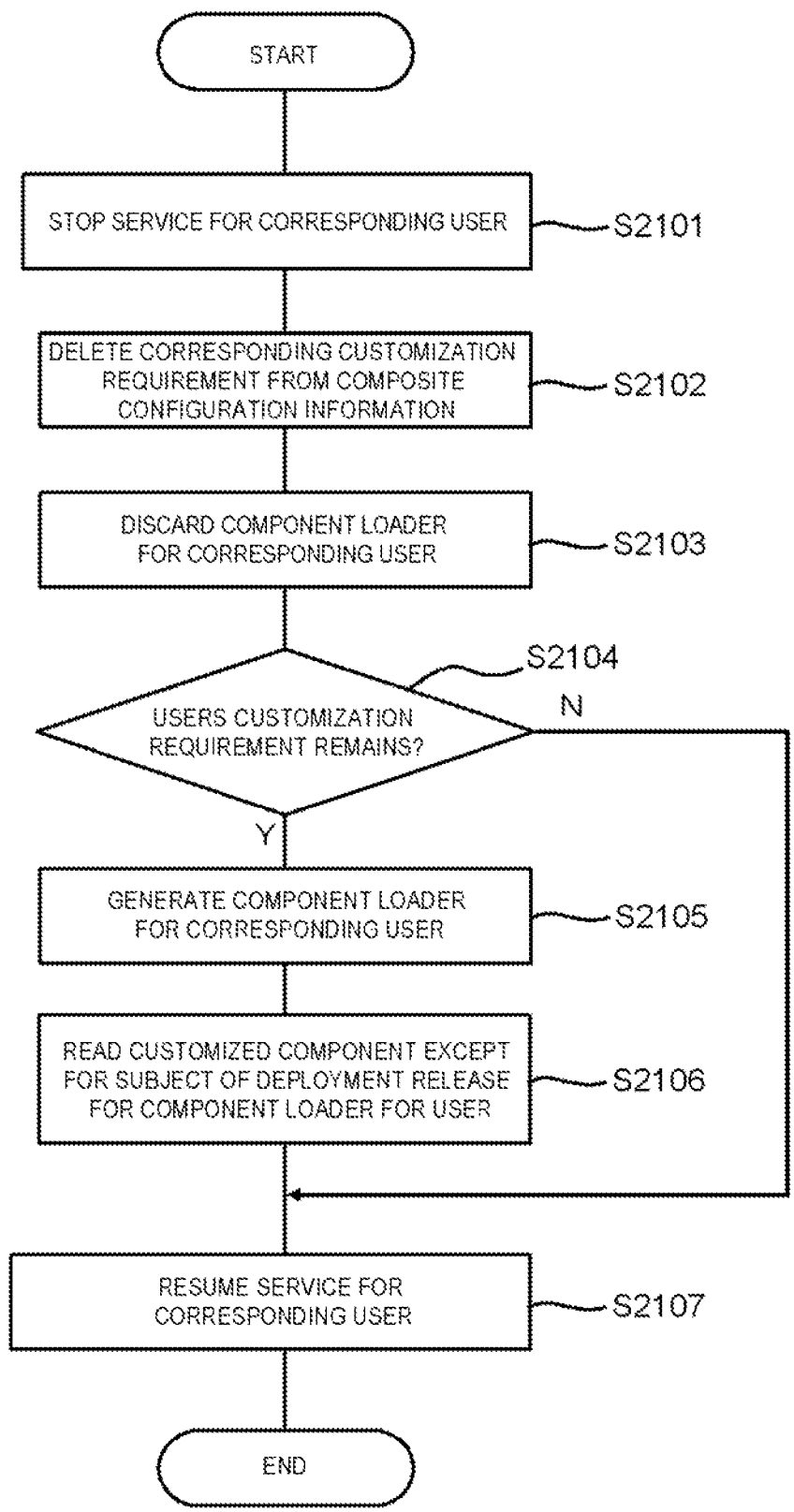
FIG. 12 is a flowchart illustrating release of customized components in a service providing apparatus according to an exemplary embodiment of the invention.
Figure 13:
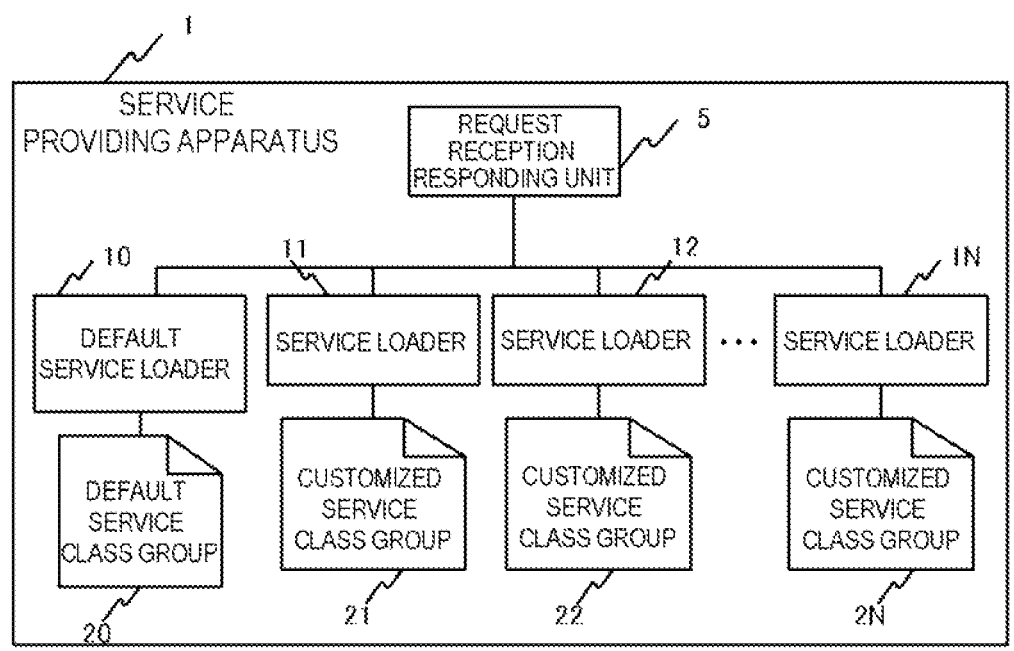
FIG. 13 is a schematic diagram illustrating the schematic configuration of a service providing apparatus.

Next, the procedure of performing the deployment release of the customized component will be described. FIG. 12 is a flowchart illustrating a process of performing deployment release of the customized component.

In the flowchart illustrated in FIG. 12, in the same manner as the case of deploying the customized component illustrated in FIG. 11, the request reception responding unit 101 first stops the service for the corresponding user (step S2101). The component injection unit 102 deletes the customization requirement to be deployment-released from the configuration information that is stored in the configuration information storage unit 104 (step S2102). Then, the loader management unit 103 discards the component loader for the corresponding user (step S2103).

After discarding the component loader for the corresponding user, the component injection unit 102 determines whether another customization requirement remains in the corresponding user (step S2104). If the customization requirement of the corresponding user does not remain ("N" in step S2104), the component injection unit 102 proceeds to step S2107.

On the other hand, if the customization requirement of the corresponding user remains ("Y" in step S2104), the loader management unit 103 generates again the component loader for the corresponding user discarded in step S2103 (step S2105). Further, the component injection unit 102 reads the customization component except for the subject of deployment release that has remained in step S2104 for the generated component loader (step S2106). Further, the request reception responding unit 101 resumes the service for the corresponding user (step S2107), and finishes the process of the deployment release of the customized component.

As described above, according to the exemplary embodiments, the deployment and the deployment release of the customization requirement can be performed in the unit of a component loader that is managed for each user. Further, the service providing apparatus 100 can refer to the component loader of another user or the default component loader without contradiction even in the case of performing deployment or deployment release of the customized component.

Accordingly, the deployment or the deployment release of the customized component of a specified user can be performed while a service of another user continues. Accordingly, both the continuity of the service and the easiness of the maintenance, which correspond to the customized requirement for each user, can be achieved.

This application claims priority based on Japanese Patent Application No. 2009-003308, filed on Jan. 9, 2009, the entire disclosure of which is incorporated herein by reference.

The invention claimed is:

1. A service providing apparatus comprising:
    a shared component storage unit storing a shared component, which is shared among users, among components composed of software components;
    a shared component loader unit reading the shared component from the shared component storage unit and retaining the shared component in an executable state;
    an individual component storage unit storing an individual component used by a user among the components composed of the software components for every user;
    an individual component loader unit reading the individual component from the individual component storage unit and retaining the individual component in an executable state;
    a configuration information storage unit storing configuration information that indicates a reference for the shared component or the individual component together with information that indicates at least one of the shared component and the individual component, which corresponds to a user identifier allocated to each user;
    a request reception unit receiving the user identifier from an external terminal through a network;
    a component acquisition unit acquiring the shared component or the individual component indicated by the configuration information that corresponds to the user identifier received by the request reception unit from the shared component loader unit or the individual component loader unit;
    a program code generation unit generating program code in an executable form by substituting the information that indicates the shared component or the individual component acquired by the component acquisition unit in the reference indicated by the configuration information;
    a program execution unit executing the generated program code and obtaining the result of the execution; and
    a responding unit responding the result of the execution to the external terminal to provide a communication service.

2. The service providing apparatus according to claim 1, further comprising
    a loader management unit making the individual component loader unit read the individual component and making the individual component loader unit retain the individual component for each user in an executable state.

3. The service providing apparatus according to claim 1, further comprising
    a presence determination unit determining whether or not the configuration information that corresponds to the user identifier received by the request reception unit is stored in the configuration information storage unit.

4. The service providing apparatus according to claim 2, wherein
    when the request reception unit receives information indicating that the allocation of another individual component that does not correspond to the user identifier is requested, together with the user identifier, the loader management unit makes the individual component loader unit read said another individual component, and the configuration information storage unit adds information that indicates said another individual component to the configuration information that corresponds to the user identifier.

5. The service providing apparatus according to claim 3, wherein
    when the presence determination unit determines that the configuration information that corresponds to the user identifier is not stored in the configuration information storage unit, the component acquisition unit acquires the shared component from the shared component loader unit, and the program code generation unit generates the program code by substituting information that indicates the shared component acquired by the component acquisition unit in the reference.

6. The service providing apparatus according to claim 1, further comprising
    a partly-shared component loader unit retaining the same individual components, which are commonly used by users accounting for a rate equal to or higher than a predetermined rate, in an executable state.

7. The service providing apparatus according to claim 6, further comprising
    a partly-shared component storage unit storing said same individual components,
    wherein the loader management unit transfers said same individual components from the individual component storage unit to the partly-shared component storage unit, and generates the partly-shared component loader unit.

8. A service providing system including an external terminal and a service providing apparatus connected to the external terminal through a network, the service providing apparatus comprising:

a shared component storage unit storing a shared component, which is shared among users, among components composed of software components;

a shared component loader unit reading the shared component from the shared component storage unit and retaining the shared component in an executable state;

an individual component storage unit storing an individual component used by a user among the components composed of the software components for every user;

an individual component loader unit reading the individual component from the individual component storage unit and retaining the individual component in an executable state;

a configuration information storage unit storing configuration information that indicates a reference for the shared component or the individual component together with information that indicates at least one of the shared component and the individual component, which corresponds to a user identifier allocated to each user;

a request reception unit receiving the user identifier from an external terminal through a network;

a component acquisition unit acquiring the shared component or the individual component indicated by the configuration information that corresponds to the user identifier received by the request reception unit from the shared component loader unit or the individual component loader unit;

a program code generation unit generating a program code in an executable form by substituting the information that indicates the shared component or the individual component acquired by the component acquisition unit in the reference indicated by the configuration information;

a program execution unit executing the generated program code and obtaining the result of the execution; and a responding unit responding the result of the execution to the external terminal to provide a communication service.

9. A service providing method including:

reading and retaining a shared component composed of a software component in an executable state;

reading and retaining an individual component composed of the software component in an executable state;

receiving a user identifier allocated to a user from an external terminal through a network;

acquiring the shared component that is retained in the executable state or the individual component that is retained in the executable state based on (i) configuration information that indicates a reference for the shared component or the individual component together with information that indicates at least one of the shared component and the individual component, which corresponds to the user identifier allocated to each user, and based on (ii) the received user identifier;

generating program code in an executable form by substituting the information that indicates the acquired shared component or the acquired individual component in the reference indicated by the configuration information;

a program executing step of executing the generated program code and obtaining the result of the execution; and a responding step of responding the result of the execution to the external terminal to provide a communication service.

10. A non-transitory computer readable recording medium storing a service providing program that enables a computer to execute:

a shared component loading procedure of reading and retaining a shared component composed of a software component in an executable state;

an individual component loading procedure of reading and retaining an individual component composed of the software component in an executable state;

a request receiving procedure of receiving a user identifier allocated to a user from an external terminal through a network;

a component acquiring procedure of acquiring the shared component that is retained in the executable state in the shared component loading procedure or the individual component that is retained in the executable state in the individual component loading procedure based on (i) configuration information that indicates a reference for the shared component or the individual component together with information that indicates at least one of the shared component and the individual component, which corresponds to the user identifier allocated to each user, and based on (ii) the user identifier received in the request receiving procedure;

a program code generation procedure of generating a program code in an executable form by substituting the information that indicates the shared component or the individual component acquired in the component acquiring procedure in the reference indicated by the configuration information;

a program executing procedure of executing the generated program code and obtaining the result of the execution; and a responding procedure of responding the result of the execution to the external terminal to provide a communication service.

* * * * *